United States Patent
Zimmermann et al.

(10) Patent No.: US 7,356,565 B2
(45) Date of Patent: Apr. 8, 2008

(54) CAMERA BASED INSTANT MESSENGER CLIENT

(75) Inventors: Remy Zimmermann, Belmont, CA (US); Aaron Standridge, Fremont, CA (US); John J. Feldis, III, Menlo Park, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 880 days.

(21) Appl. No.: 10/608,773

(22) Filed: Jun. 27, 2003

(65) Prior Publication Data

US 2004/0267885 A1 Dec. 30, 2004

(51) Int. Cl.
*G06F 15/16* (2006.01)
(52) U.S. Cl. ..................................... 709/206
(58) Field of Classification Search ................ 709/204, 709/206, 229, 232
See application file for complete search history.

(56) References Cited

U.S. PATENT DOCUMENTS

| | | | |
|---|---|---|---|
| 6,757,365 B1* | 6/2004 | Bogard | 379/88.17 |
| 2002/0103917 A1* | 8/2002 | Kay et al. | 709/229 |
| 2002/0107904 A1* | 8/2002 | Talluri et al. | 709/202 |
| 2003/0189643 A1* | 10/2003 | Quintana | 348/207.1 |
| 2003/0233424 A1* | 12/2003 | Seo | 709/217 |
| 2004/0019683 A1* | 1/2004 | Lee et al. | 709/227 |
| 2004/0152477 A1* | 8/2004 | Wu et al. | 455/466 |
| 2005/0033806 A1* | 2/2005 | Harvey et al. | 709/204 |

FOREIGN PATENT DOCUMENTS

WO WO01/11586 A1 2/2001

* cited by examiner

*Primary Examiner*—Krisna Lim
(74) *Attorney, Agent, or Firm*—Townsend and Townsend and Crew, LLP (57) ABSTRACT

A method and system for providing communication with devices using instant messaging, by enabling a device to be an autonomous IM user. In one embodiment, a unique user login is obtained from an IM service for the device, and this unique user login is stored (e.g., on the device itself, or on another entity such as a computer or a remote server). Once the device is connected to the network, the device can then log onto the IM service, and function as an IM user. Other IM users can then communicate with the device. In one embodiment of the present invention, the device can both send and receive messages. In one embodiment, received messages can be interpreted as commands to the device, based on pre-defined instructions.

16 Claims, 6 Drawing Sheets

- Friends → 302
    - Jay
    - Aaron
- My devices → 312
    - Webcam
    - Refrigerator
    - Thermostat
- Other devices →322
    - Jay's webcam
    - Aaron's webcam → 324
- Work → 302
    - Mary
    - Bill

CAMERA BASED INSTANT MESSENGER CLIENT

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

FIELD OF THE INVENTION

The present invention relates generally to internet messenger services over the Internet, and more specifically to device based instant messenger clients.

BACKGROUND OF THE INVENTION

Over the past few years, contact established by people with each other over the Internet has increased tremendously. In particular, Instant Messaging (IM), which permits people to communicate with each other over the Internet in real time, has become increasingly popular. More recently, Instant Messaging also permits users to communicate not only using text alone, but also using audio, still pictures, video, etc.

Several IM programs are currently available, such as America OnLine Instant Messenger (AIM) from America Online, Inc. (Dulles, Va.), MSN® Messenger from Microsoft Corporation (Redmond, Wash.), and Yahoo!® Instant Messenger from Yahoo! Inc. (Sunnyvale, Calif.).

These IM services have varied user interfaces. However, most of them work in the same basic manner. Each user chooses a unique user ID (the uniqueness of which is checked by the IM service), as well as a password. The user can then log on from any machine (on which the corresponding IM program is downloaded) by using his/her user ID and password. Conventionally, the IM services therefore are associated with, and "follow" from location to location, an individual (i.e., human) user. Thus, currently, if the user has a certain device connected to a specific personal computer (PC), he cannot control that device when he logs onto an IM service from a remote location. For instance, currently, if a user has a webcam connected to his home PC, he cannot control that webcam when he logs on to an IM service from his office PC. This is because currently, it is the human that has the IM presence, rather than any device. So while devices (e.g., cell phones, laptops, etc.) can be used by an IM user to log on to IM services, the devices themselves do not have a unique IM presence.

Some attempts have been made at communicating with various devices. The upcoming concept of the "Connected Home" is an example of such an attempt, where various household appliances etc. can be controlled remotely. Such communication may take place over the phone, over the web, etc. In such cases, the user of the device needs to initiate any communication with the devices. In such examples, the devices do not have independent identities as IM users, which can initiate sending IM messages to users.

Some attempts have also been made at automating instant messaging. One example of this is SmarterChild, which is an interactive agent built by ActiveBuddy, Inc. (Such interactive agents are software applications, often called "bots," some of which interact with users on Instant Messaging.) Communication with SmarterChild can provide answers to questions such as when a certain band is playing, or what the weather is like, etc. However, SmarterChild is a "service-based" bot, and does not provide communication with any physical device which the user may want to control, or hear from.

Thus there is a need for a system and method where a device can be assigned a unique user login, and can "log on" as an IM user. Further, there is need for a system and method where users can communicate bi-directionally with such devices.

BRIEF SUMMARY OF THE INVENTION

The present invention is a system and method for providing communication with devices using instant messaging, by enabling a device to be an independent IM user.

The present invention adapts an instant messenger system intended for communication between humans sending messages, to allow it to be used by a device as the message sender/recipient. In one embodiment, software converts text sent to the device into controls for the device, and converts outputs of the device into text messages. In one embodiment, the device only uses a portion of the instant messenger functionality available to a human user. The device can be programmed to automatically send messages, and automatically initialize itself as an instant messenger user.

In one embodiment, a unique user login is obtained from an IM service for the device, and this unique user login is stored on the device itself. Once the device is connected to the network, the device can then log onto the IM service, and function as an IM user. Other IM users can then communicate with the device. In one embodiment of the present invention, the device can both send and receive messages.

Examples of devices which can function as IM users include, amongst others, webcams, digital cameras, home appliances (e.g., refrigerator, microwave, etc.), thermostats, game consoles, etc. In accordance with an aspect of the present invention, such devices can initiate communication to alert other IM users when certain pre-specified criteria are satisfied. For example, a webcam can alert its remotely located owner when motion is detected. Another example is that a thermostat can alert a resident of the home if the system malfunctions, or if temperature falls below, or exceeds, a certain threshold.

In accordance with another aspect of the present invention, a remotely located IM user can direct a device to follow certain instructions. An example of this is instructing a webcam to zoom, pan, tilt, etc. Another example of this is instructing an oven to switch on for a certain amount of time at a certain temperature. In an embodiment of the present invention, such a device is instructed to accept communication from only certain pre-specified IM users. Further, in one embodiment, such a device is provided with a glossary, or a list of certain terminologies, and how to interpret them. For instance, a webcam can be instructed that the IM communication "zoom in" is to be treated by it in the same manner as a user pressing its zoom-in button once.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE INVENTION

The figures depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein.

Figure 1A:
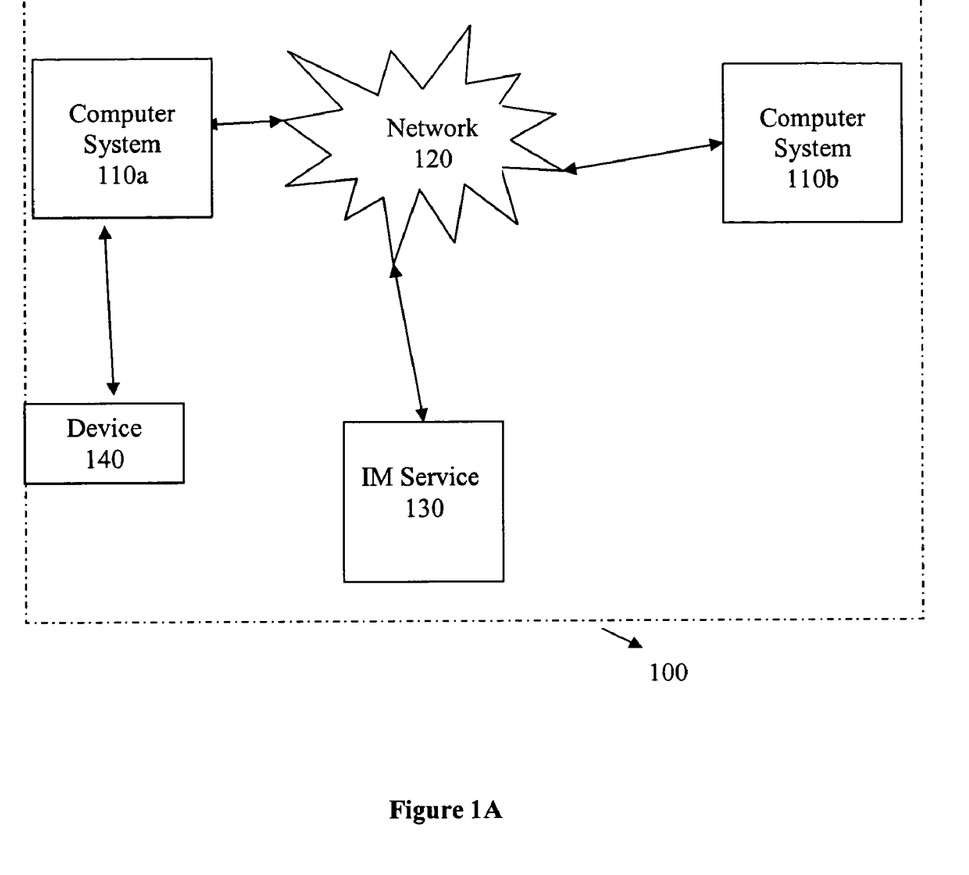
FIG. 1A is a block diagram of a conventional system using instant messaging.

FIG. 1A is a block diagram illustrating a conventional system 100 which users use to communicate via IMs. FIG. 1A includes two computer systems 110a and 110b, a network 120, an IM service 130, and optionally a device 140. Such a system 100 can be used by individuals using computer systems 110a and 110b to communicate with each other using instant messaging.

The computer systems 110a and 110b are conventional computer systems, that may each include a computer, a storage device, a network services connection, and conventional input/output devices such as, a display, a mouse, a printer, and/or a keyboard, that may couple to a computer system. The computer also includes a conventional operating system, an input/output device, and network services software. In addition, the computer includes IM software for communicating with the IM service 130. The network service connection includes those hardware and software components that allow for connecting to a conventional network service. For example, the network service connection may include a connection to a telecommunications line (e.g., a dial-up, digital subscriber line ("DSL"), a T1, or a T3 communication line). The host computer, the storage device, and the network services connection, may be available from, for example, IBM Corporation (Armonk, N.Y.), Sun Microsystems, Inc. (Palo Alto, Calif.), or Hewlett-Packard, Inc. (Palo Alto, Calif.).

The network 120 can be any network, such as a Wide Area Network (WAN) or a Local Area Network (LAN), or any other network. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). The network 120 may also include commercially available subscription-based services such as, for example, AOL from America Online, Inc. (Dulles, Va.) or MSN from Microsoft Corporation (Redmond, Wash.).

The IM service 130 can be any of the available IM services. Some examples of the currently available IM programs are America OnLine Instant Messenger (AIM) from America Online, Inc. (Dulles, Va.), MSN® Messenger from Microsoft Corporation (Redmond, Wash.), and Yahoo!® Instant Messenger from Yahoo! Inc. (Sunnyvale, Calif.).

A device 140 may also be connected to the computer system 110. An example of such a device is a camera (e.g., a webcam, a digital still camera, etc.). Such a device 140 can be, for example, a QuickCam® from Logitech, Inc. (Fremont, Calif.).

Figure 1B:
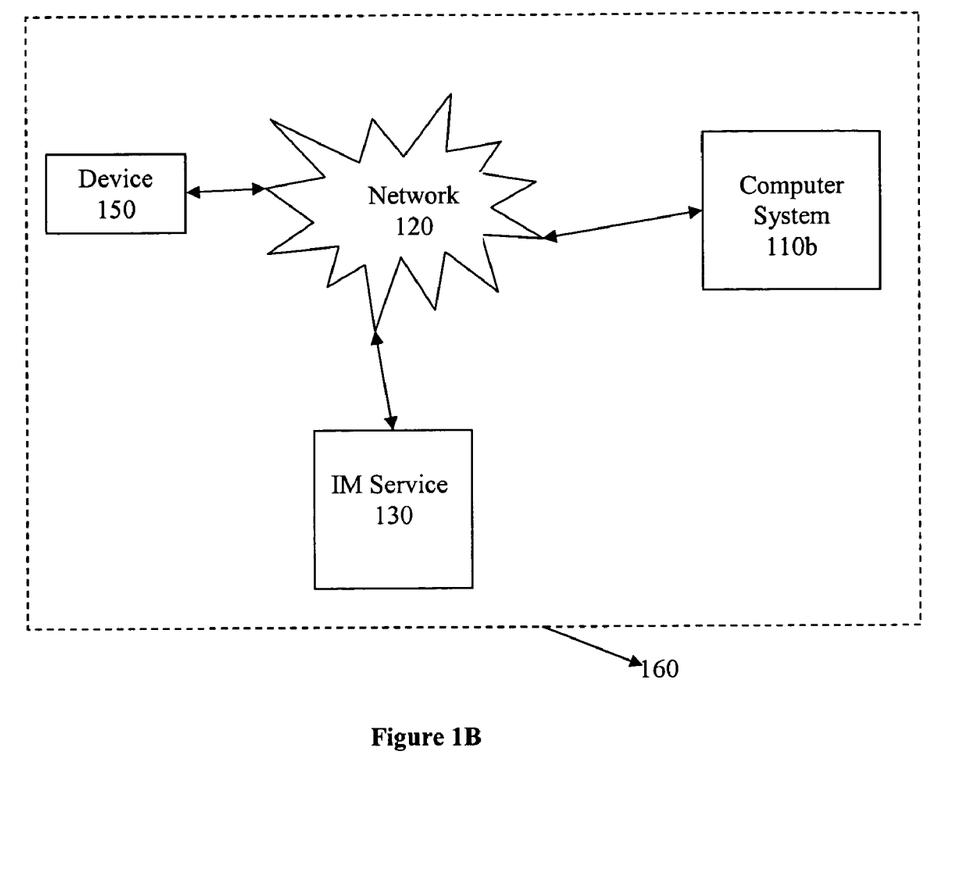
FIG. 1B is a block diagram of a system using instant messaging in accordance with an embodiment of the present invention.

FIG. 1B is a block diagram illustrating a system 160 in accordance with an embodiment of the present invention. FIG. 1B includes a computer system 110b, a network 120, an IM service 130, and an IM-enabled device 150. Such a system 160 can be used by individuals using computer system 110b to communicate with the device 150 using instant messaging.

Computer system 110b, network 120, and IM service 130 are as described above with reference to FIG. 1A. In accordance with an embodiment of the present invention, device 150 is an IM-enabled device. Device 150 is capable of functioning as a unique IM client. Examples of devices which can function as IM users include, amongst others, webcams, digital cameras, home appliances (e.g., refrigerator, microwave, etc.), thermostats, game consoles, etc. In one embodiment, as shown in FIG. 1B, device 150 is connected directly to the network 120. In other embodiments, device 150 may also be connected to the network via another entity (e.g., a cell-phone, a PDA, etc.). The details of device 150 are discussed in more detail below with reference to FIG. 5.

As mentioned above, system 100 can be used by individuals using computer systems 110a and 110b to communicate using instant messaging. In order to do so, both the computers being used to communicate need to have downloaded on them software for the IM service 130. When the IM software is launched, a "buddy list" can be created by the user, identifying the various people or "buddies" (other IM users) with whom the user wishes to communicate.

Figure 2:
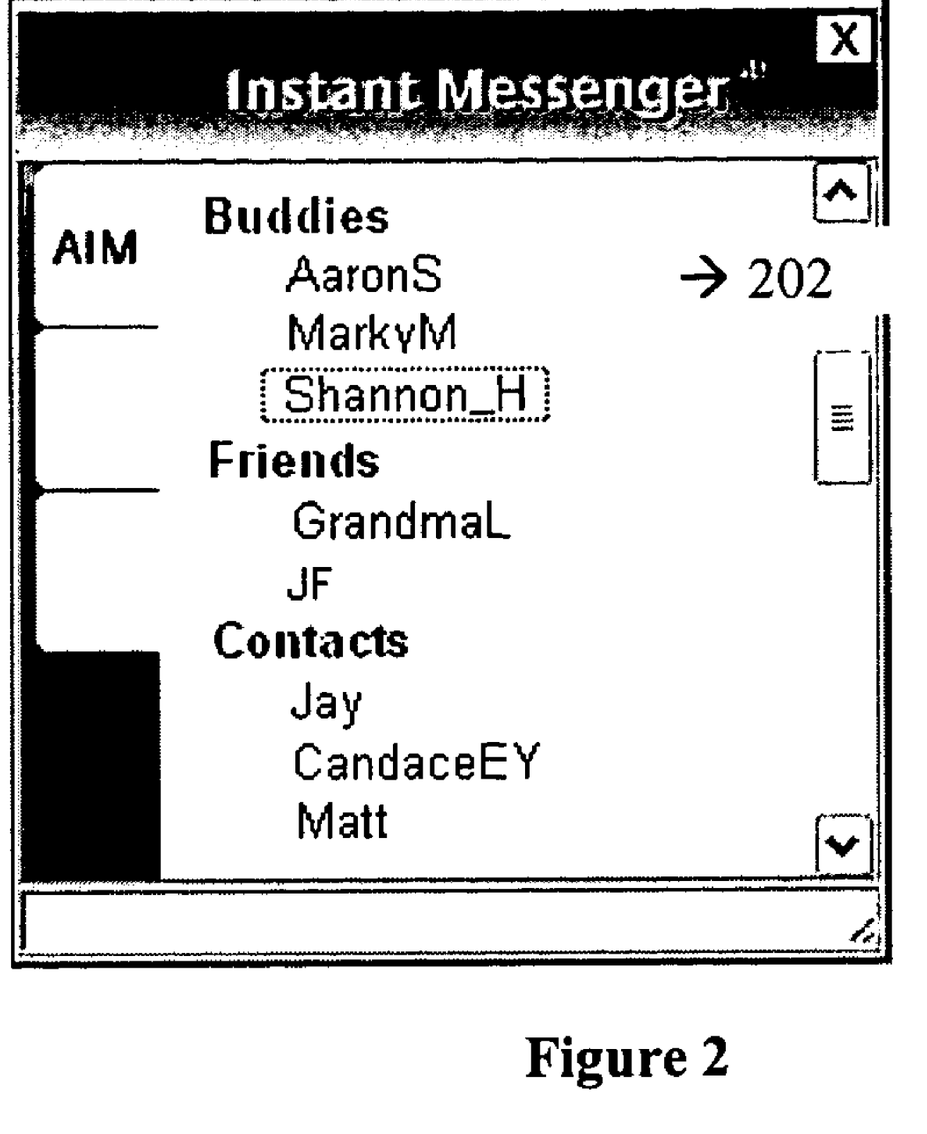
FIG. 2 is a screen shot of a conventional buddy list for an instant messenger.

FIG. 2 is a screen shot illustrating what a buddy list looks like for a conventional system 100. In most IM programs, a chat can be started with a buddy by simply double clicking on the name corresponding to the buddy. This name corresponding to a buddy may be the buddy's user ID, the buddy's name, a nickname assigned to the buddy by the user, etc.

In such a conventional system, if a user wished to establish contact with a buddy's device 140, he would have to first establish contact with the buddy. For instance, in order to view a buddy's (e.g., Aaron's) webcam, the user would need to double-click on the buddy name corresponding to Aaron (in this case, "AaronS") 202, and thus establish contact with the person Aaron. The user would then have to request Aaron to provide him access to the webcam. Thus conventionally, the person who owns the device must be disturbed in order to gain access to the device itself.

In some IM programs (e.g., in Yahoo! IM), it is possible for users to provide a status such as "View Webcam" indicating that their webcam is on and functioning, and it is possible for buddies to view the webcam if permission is granted. Even in such cases, as mentioned above, the persons who own the webcam need to be disturbed to establish contact and obtain permission for viewing the webcam. Further, the owner of the webcam may have buddies who he is willing to communicate with, but whom he may not want to provide with access to his webcam. Such buddies may ask the owner for permission to view the webcam, thus placing the owner in the uncomfortable situation of having to refuse them access.

In other IM programs (e.g., AIM), it is not possible for users to indicate whether or not their webcam is currently viewable. Thus in such cases, users may disturb the owner of the device even when it is not possible for them to interact with the device (e.g., when the owner is away from the home PC, and his webcam is connected to the home PC).

Further, in such conventional systems, an IM user does not have any way of communicating with his own devices using instant messaging, once he is at a location remote from them. In addition, a user has no way of communicating with another user's devices using instant messaging, once the other user is at a location remote from his devices.

In order to avoid unnecessary disturbances and/or uncomfortable interactions discussed above with reference to FIG. 2, as well as to make it possible to communicate remotely with devices via instant messaging, in accordance with the present invention, a device is provided with its own userid/password for the IM services. The device then operates as a separate "buddy" entity on the IM program, and can have separate buddy lists of its own.

Figure 3:
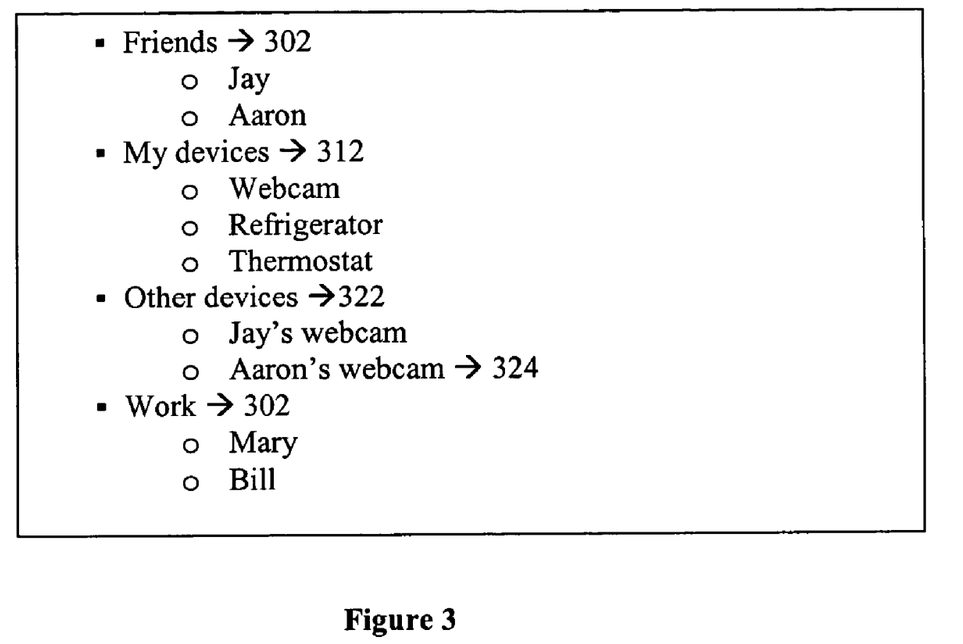
FIG. 3 is a diagram illustrating a buddy list in accordance with an embodiment of the present invention.

An example of a buddy list in accordance with an embodiment of the present invention is provided in FIG. 3. It can be seen that in accordance with an embodiment of the present invention, the buddy list includes not only other individuals 302 who use the IM program, but also devices. In one embodiment, the user's own devices 312 can be included as buddies. In another embodiment, devices 322 belonging to another user can be included as buddies. In yet another embodiment, one's own devices as well as devices belonging to others can be included as buddies.

The problems described with reference to FIG. 2 above can be circumvented with a system in accordance with the present invention. As an example, Aaron's webcam can now be a separate IM user. In one embodiment, Aaron can then determine who the webcam buddy 324 can communicate with, and who can communicate with the webcam buddy 324. Thus, Aaron can avoid any uncomfortable interactions described above, by controlling the webcam's buddy list behind the scene.

Second, Aaron will not need to be disturbed when a user wishes to view his webcam. A user wishing to view Aaron's webcam can simply double-click on the name corresponding to the webcam 324 (rather than on the name corresponding to Aaron himself).

Further, a user can communicate with his (or another user's) devices using instant messaging even when he (or the other user) is at a location remote from the device. In one embodiment, it is possible to control the webcam by providing the webcam with instructions (e.g., zoom in, zoom out, pan, tilt right, tilt left, etc.), which the webcam can then implement. This is discussed in greater detail with reference to FIG. 5 below.

One example of an application of the present invention is to have an IM enabled webcam installed in a conference room. For instance, in one embodiment, a meeting taking place in the conference room can be "attended" using instant messaging, simply by double-clicking on the webcam buddy in the buddy list. In another embodiment, it may be required to instruct the camera that a view of the conference room should be provided to the user. It will be obvious to one of ordinary skill in the art that various webcams can be installed in various conference rooms, and can be communicated with as needed via instant messaging.

Another example of an application of the present invention is to have IM enabled devices around the home, which can communicate via IM with their owner/administrator/maintainer, etc. For instance, in one embodiment, a thermostat is IM enabled in accordance with the present invention. An IM user then sees the thermostat as a "buddy" on his buddy list. The IM user then communicates in an easy and efficient manner with this thermostat. In one embodiment, the communication includes questions such as "What is the current temperature in the house?" or short questions using keywords such as "Current temp?", and responses such as "65 degrees F." Further, in one embodiment, instructions are provided to the thermostat, which the thermostat implements. An example of an instruction is "Make temp 70 degrees F."

Further, in one embodiment, the device also initiates an IM communication with the user when the need arises. For instance, an IM to the user may be sent by the thermostat, stating "Thermostat failed."

In order for such communication with a thermostat to be meaningful, in one embodiment of the present invention, a certain "dictionary" of words/instructions, and required responses would need to be provided to the thermostat. Also, in one embodiment, software/hardware to implement the instructions would be provided in advance to the thermostat or other such devices.

In one embodiment, such IM enabled devices are configured to communicate with any IM user who contacts them. In another embodiment, such IM enabled devices are configured to communicate only with certain pre-specified IM users. It is to be noted that various such configuration specifics can be varied, and/or be specified by the device owner/administrator/maintainer, etc.

Figure 4:
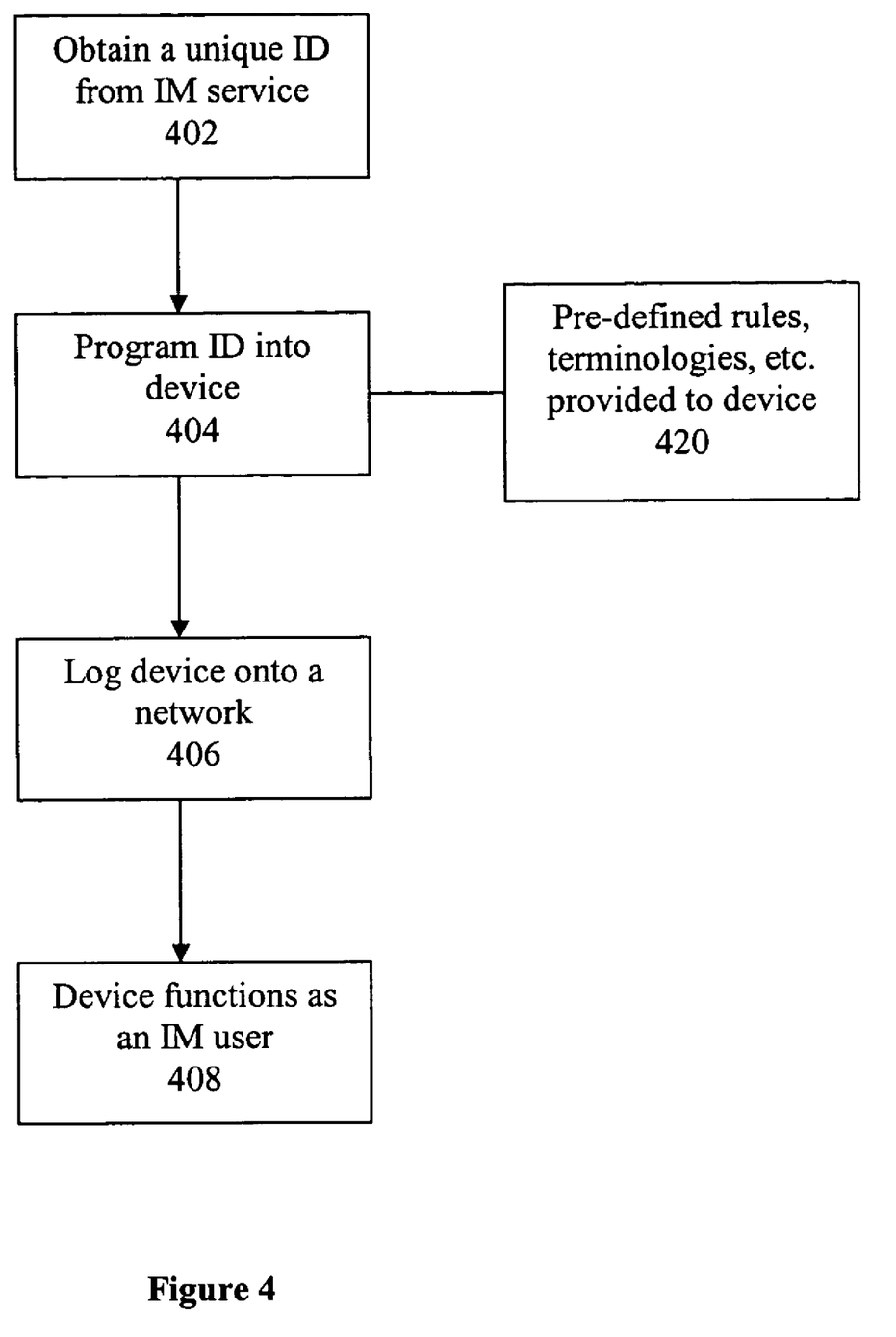
FIG. 4 is a flowchart illustrating the working of a system in accordance with an embodiment of the present invention.

FIG. 4 is a flowchart illustrating how a device is IM enabled in accordance with one embodiment of the present invention. The flowchart illustrates obtaining (step 402) a unique login from an IM service, programming (step 404) the ID into the device, the device logging on (step 406) to the network, and the device functioning (step 408) as an IM user. Optionally, the owner may pre-define (step 420) certain rules, terminologies, etc. for the device to use in its IM communications.

A unique login (generally comprising of an ID/password) is set up (step 402) with the IM service 130. This can be done in one of several ways. One way is for the owner of the device to interact with the IM service 130 to obtain a unique user ID and select a unique password. In one embodiment, the owner gives a user name to the device 150 during configuration, and also creates a buddy list associated with this user name. It is to be noted that the "owner" of the device may be the actual owner of the device, the maintainer, the administrator of the device, any person who may be setting up the system, etc. In one embodiment, the device is a webcam, or some other kind of digital camera. In one embodiment, the device is a home appliance, such as a refrigerator, microwave, etc.

In one embodiment, the owner enters the information needed for the initial configuration into a computer. A USB dongle is then used to transfer information from the host PC to the device 150. In another embodiment, a local area network and a web browser interface are used to transfer the information to the device 150. In yet another embodiment, an external network service (e.g., Spotlife.com) is used to transfer the information to the device 150.

In one embodiment of the present invention, the unique login is programmed (step 404) into the device. In such an embodiment, a network-enabled device is capable of logging in to the network directly, without needing to go through a computer system 110. In another embodiment, the unique login obtained for the device is stored on another entity (e.g., a computer system 110, a Personal Digital Assistant, a cell phone, etc). The device 150 connects to the network 130 via the other entity. It is to be noted that more than one device may be connected to the other entity. For instance, in accordance with an embodiment of the present invention, a webcam, a thermostat, and a refrigerator, may each be connected to the same computer system 110, and would each have a unique login. In yet another embodiment, the unique login for the device may be stored on a separate entity (e.g., a computer, a remote server). The device 150 may connect to the network (either directly, or through a computer, cell phone, etc.), and then connect to the remote entity to obtain its unique login. One skilled in the art will note that in one way or another, the device 150 needs to have access to the unique user login.

The device 150 then logs onto (step 406) a network. As mentioned above, in one embodiment, the device 150 logs onto the network directly. In another embodiment, the device 150 may log onto the network via another entity (e.g., a computer system 110, a Personal Digital Assistant, a cell phone, etc.).

The device 150 then functions (step 408) as an IM user. In one embodiment, the device 150 can send messages to its IM buddies. In one example, a webcam is programmed to send a message to its owner when a certain trigger event occurs (e.g., the device 150 detects any motion). In another embodiment, a webcam is programmed to send a message to everyone on its buddy list when a certain trigger event occurs. In one embodiment, the device 150 can receive messages from its IM buddies. For example, a webcam can be programmed to zoom in/out, and tilt left/right, upon receiving appropriate instructions. In another embodiment, the device 150 can both send messages to, and receive messages from, its IM buddies.

In one embodiment, the owner of the device 150 predefines (step 420) some rules, terminologies, etc., which the device 150 can use in its IM communications. Such predefined terminologies can include possible queries, responses, and implementation of instructions. For instance, it can be predefined that for a webcam, the message "Show view" is equivalent to pressing the "record" button on it, and that the message "Zoom in" is equivalent to pressing the webcam's zoom button once.

The following is an example of a communication that can occur between a webcam and its owner (at a remote location):

Webcam: Motion detected
Owner: Show view
(Webcam starts showing owner the current view that it is capturing).
Owner: Zoom in
(Webcam zooms in).

In one embodiment, the Universal Plug and Play (uPnP) standard may be used. In one embodiment, the "plug and play" functionality for network systems provides automatic setup for networked devices to become IM clients. For example, every device added to Aaron's network would automatically become an IM enabled device accessible by Aaron, and be added to Aaron's buddy list. In one embodiment, the IM user login for the device is based on Aaron's login name.

Figure 5:
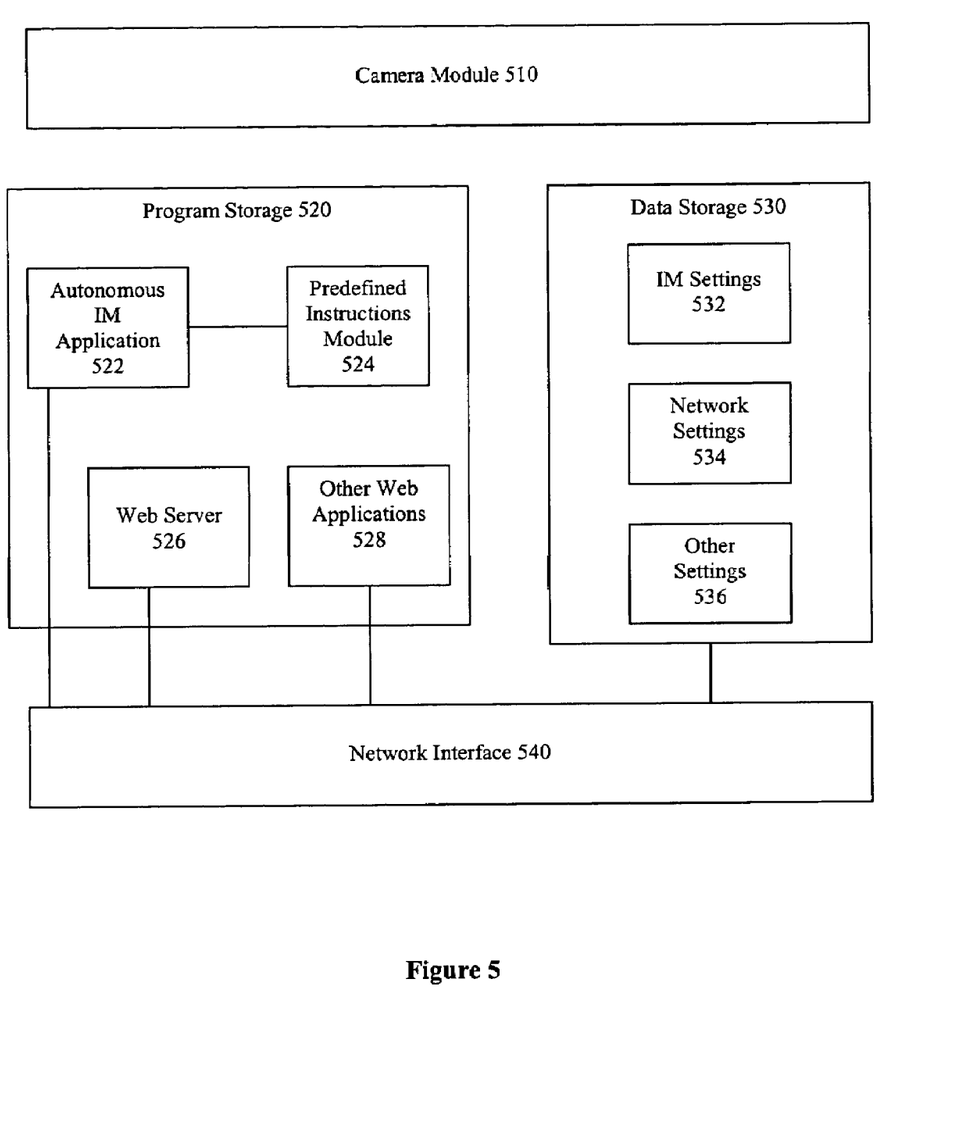
FIG. 5 is a block diagram of a camera in accordance with an embodiment of the present invention.

FIG. 5 illustrates an IM-enabled device 150 in accordance with an embodiment of the present invention. For purposes of example, the device 150 in FIG. 5 is an IM-enabled camera. The camera 500 includes a camera module 510, a program storage 520, a data storage 430, and a network interface 540.

The camera module 510 includes a lens, image sensor, color processing, compression, and other such modules which make up a conventional camera.

The program storage 520 includes an autonomous IM application 522, a pre-defined instructions module 524, a web server 526, and other web applications 528. The autonomous IM application 522 enables the camera 500 to be an independent IM user. The autonomous IM application 522 can connect to a network through the networking interface 540. The camera 500 can indicate its presence as an IM user, and autonomously initiate messages to, and receive messages from, other IM users. As mentioned above, the camera 500 will have a unique IM ID, and an independent IM existence, separate and apart from the owner of the camera. The specific protocols/standards used by the IM application may vary. For instance, in one embodiment, the protocol used by an IM client to establish a network connection and indicate presence information is the Session Initiation Protocol (SIP). Another example of such a protocol is SIP for Instant Messaging Presence Leveraging Extensions (SIMPLE). As yet another example, the protocol used is a proprietary protocol.

The predefined instructions module 524 contains instructions/rules on how the camera should function as an IM client. In one embodiment, these include instructions on how the camera should interpret the IM messages it may receive, and what messages the camera should send. In one embodiment, it is based on these predefined instructions that communications such as the example provided above occur. In one embodiment, the device 150 compares the text of the instant message received to a list of commands/instructions. If matching text is found, the corresponding command is executed by the device 150. In one embodiment, the format of the commands is <action>[Parameters . . . ]. These commands could affect either the configuration of the device or the current stream settings. Some sample commands are: Zoom In 3×, Pan Left 10 degrees, Change Password ****, etc. If there is no match between the received text and the list of commands, in one embodiment, the device 150** sends an error message to the sender of the instant message. In one example, the error message states that the command is not recognized.

In another embodiment, the predefined instructions module 524 also contains instructions on when/how often the camera should log in as an IM user. For example, in one embodiment, the camera 500 is instructed to log-in after a trigger event occurs (e.g., it captures motion), and send an appropriate message to its owner (e.g., Motion observed). In another example, the camera 500 is logged on as an IM user all the time.

The web server 526 serves to by allowing the camera 500 to communicate with the Internet by providing the camera with its own IP address. There may also be other web-based applications 528 on the camera 500.

The data storage 530 includes IM settings 532, network settings 534, and other settings 536. The IM settings 532 include, in one embodiment, data needed for the IM communications, such as buddy lists, other information about the IM users with whom the camera 500 can communicate, and/or from whom the camera can receive communication, and so on. Network settings 534 include other data relating to network connections. In addition, other settings 536 may be included.

The network interface 540 serves as an interface between the camera 500 and the network 120. In some embodiments, the camera 500 may be connected directly to the network 120. In other embodiments, the camera 500 may be connected to the network 120 through another entity, such as a personal computer, a cell-phone, etc.

It is to be noted that in one embodiment, the IM-functionality of a device discussed above may be split between the device and another location. In other words, one or more modules described above may not be present in the device 150 itself, but rather may be in a separate location (e.g., a local computer, or a remote server with which the device 150 can communicate over the network 120). One example of such a distributed IM functionality is when the predefined instructions module 524 is on a remote server rather than in the camera 500. In addition, the IM settings 532 can also be on a remote server rather than in the camera 500. The server-based IM emulator (or "bot") then provides the IM presence for the camera 500. The server-based emulator communicates with the camera 500, translating and relaying commands from a remote user to the camera 500, and data from camera 500 to the remote user. For instance, the server-based emulator may instruct the camera 500 to record video, or to playback previously taped video clips. Such distributed IM functionality relieves the device 150 from having to host a full IM client while still providing such functionality. This will allow simpler, lower cost hardware to be used in the device. Additionally, it may be easier to set up the device as an "IM client" since the software in the device itself may not need to be modified significantly to establish IM identity. The ability to use the device software relatively unmodified will also make it easier to modify, update, or change the IM client used by the device.

As will be understood by those of skill in the art, the present invention may be embodied in other specific forms without departing from the essential characteristics thereof. For example, various devices in accordance with the present invention can communicate with each other, rather than with a human user. While particular embodiments and applications of the present invention have been illustrated and described, it is to be understood that the invention is not limited to the precise construction and components disclosed herein and that various modifications, changes, and variations which will be apparent to those skilled in the art may be made in the arrangement, operation and details of the method and apparatus of the present invention disclosed herein, without departing from the spirit and scope of the invention, which is defined in the following claims.

What is claimed is:

1. A method for communicating with a camera connectable to a network, the method comprising:
    enabling the camera to function as a unique instant messenger client for an instant messenger service by registering a unique login with the instant messenger service for the camera, and programming the unique login into the camera;
    receiving messages from the camera over the network via the instant messenger service;
    whereby the camera, instead of a human user, acts as the instant messenger client, and becomes a buddy on the instant messenger service;
    sending messages to the camera over the network over the instant messenger service; and
    converting said messages into commands for said camera.

2. The method of claim 1, further comprising:
    pre-defining at least one pre-existing user of the instant messenger service with whom the camera is allowed to communicate.

3. The method of claim 1, further comprising:
    sending messages to the camera over the network over the instant messenger service.

4. The method of claim 3, further comprising:
    pre-defining at least one message which can be sent to the camera, and at least one action to be taken by the camera upon receiving the message.

5. The method of claim 1, wherein the messages received from the camera over the network via the instant messenger service are initiated by the camera in response to a pre-specified criterion being satisfied.

6. The method of claim 1, wherein the camera is a webcam.

7. The method of claim 6, wherein the webcam initiates sending a message over the network via the instant messenger service when the webcam detects motion.

8. A method for communicating with a camera using an instant messenger service, the method comprising:
    enabling the camera to function as an instant messenger client for the instant messenger service by registering a unique login with the instant messenger service for the camera;
    connecting the camera to a network;
    receiving messages from the camera over the network over the instant messenger service; and
    sending messages to the camera over the network over the instant messenger service;
    whereby the camera, instead of a human user, acts as the instant messenger client, and becomes a buddy on the instant messenger service so that direct communication with the camera through the instant messenger service is possible.

9. The method of claim 8, further comprising:
    pre-defining at least one message which can be sent to the camera, and at least one action to be taken by the camera upon receiving the message.

10. The method of claim 8, wherein the messages received from the camera over the network are initiated by the camera in response to a pre-specified criterion being satisfied.

11. A camera enabled to function as a unique instant messenger user over a network, the camera comprising:
    an autonomous IM application module, which identifies the camera as a unique instant messenger user to an instant messenger service; and
    a network interface coupled to the autonomous IM application module, to connect to the network to communicate with at least one other instant messenger user over the instant messenger service;

whereby the camera, instead of a human user, acts as the instant messenger client, and becomes a buddy on the instant messenger service so that direct communication with the camera through the instant messenger service is possible.

12. The camera of claim 11, wherein the autonomous imaging module initiates communication with the at least one other instant messenger user.

13. The camera of claim 11, wherein the camera is a webcam.

14. The camera of claim 11, wherein the camera is compliant with a Session Initiation Protocol (SIP).

15. The camera of claim 11, wherein the camera is compliant with a SIP for Instant Messaging Presence Leveraging Extension protocol (SIMPLE).

16. The camera of claim 11, further comprising:
a predefined instructions module coupled to the autonomous IM application, to instruct the camera regarding interpreting instant messages received from the at least one other instant messenger user.

* * * * *